July 4, 1950     M. L. HATFIELD     2,513,798
CENTRIFUGAL CLUTCH
Filed April 28, 1947

INVENTOR
MILTON L. HATFIELD
BY Liverance and
Van Antwerp
ATTORNEYS

Patented July 4, 1950

2,513,798

UNITED STATES PATENT OFFICE 2,513,798

CENTRIFUGAL CLUTCH

Milton L. Hatfield, Elkhart, Ind.

Application April 28, 1947, Serial No. 744,350

2 Claims. (Cl. 192—105)

The present invention relates to a clutch of the centrifugal type. It is an object and purpose of the invention to provide a clutch structure, interposed between driving and driven members, in which said members are automatically connected together upon the attainment of a predetermined speed of the driving member, and more particularly to provide a simple and novel clutch structure of the character stated, wherein the engagement and connection of driving and driven members may be adjusted to vary the predetermined speed of the driven member at which the clutch connection occurs.

It is a further object of the invention to provide the adjustable centrifugal clutch in a structural embodiment which is very economical to produce, durable in service, and particularly effective for the purpose for which it is designed. Such type of clutch is particularly useful, for example, in small motor-driven vehicles of the scooter type, driven by an internal combustion engine of low horse-power, wherein the connection with the driven axle and wheels of the scooter is obtained by speeding up the engine beyond a certain speed, and the clutch is automatically disconnected on diminishing such speed of rotation below the particular engine speed for which the clutch adjustment has been made. It is of course, understood that the clutch is useful in other relations than in small motor vehicles, and its use is not to be restricted to the one example given. A further object of the invention is to provide means automatically disengaging the clutch at any time the power is cut off.

Figure 1:
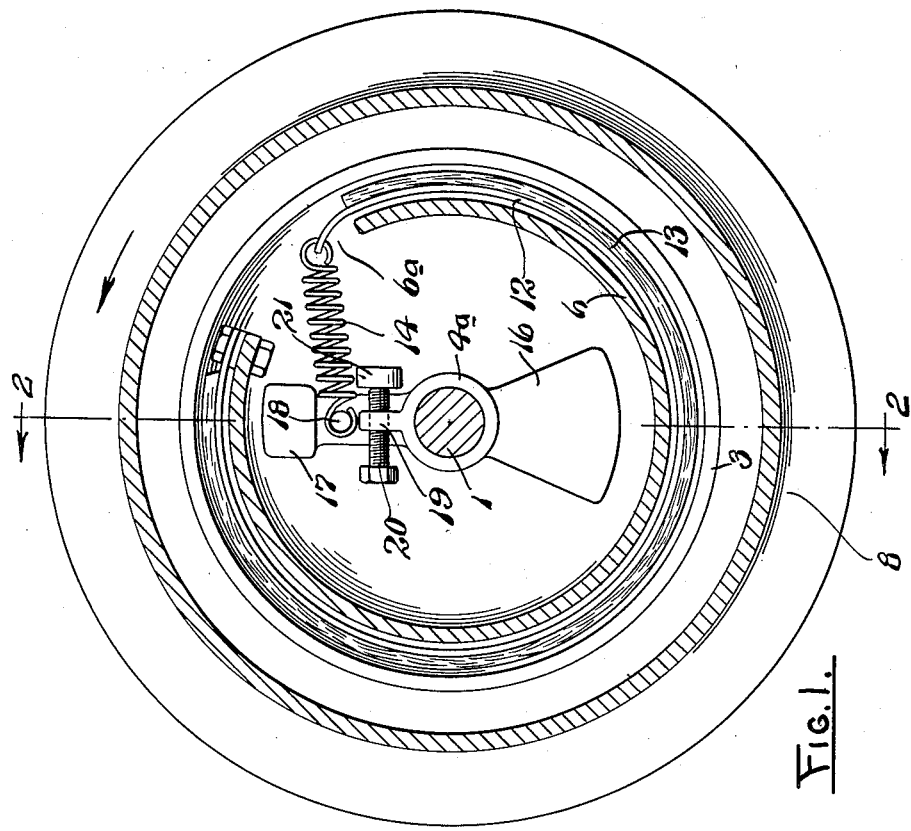
Figure 2:
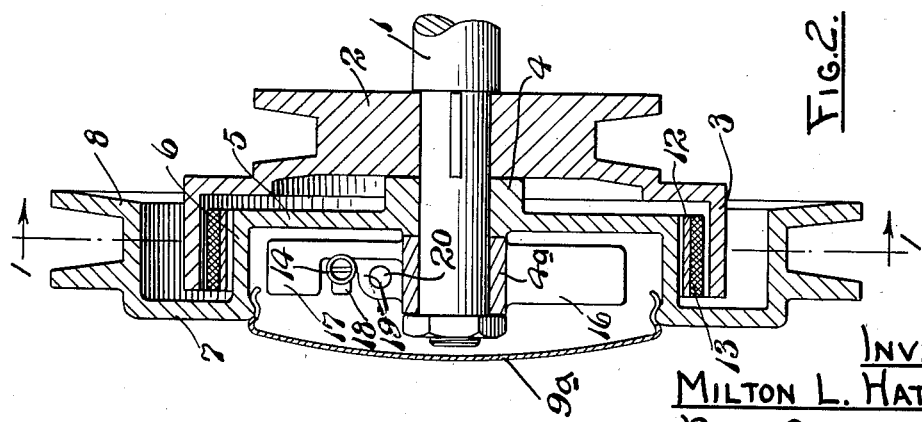

An understanding of the invention may be had from the following description, taken in connection with the accompanying drawing, in which, Fig. 1 is a vertical section substantially on the plane of line 1—1 of Fig. 2, Fig. 2 is a central transverse vertical section through the clutch, substantially on the broken plane indicated by the line 2—2 of Fig. 1.

Like reference characters refer to like parts in the different figures of the drawing.

In the drawing showing a preferred structure embodying my invention, a shaft 1 which will be a driven shaft, has keyed thereto a hub 2 which, while shown as formed has a pulley adapted to have a V-belt associated therewith, for the invention may be merely a hub without having connected therewith any means for driving a belt therefrom. The hub at its inner side is continued and terminates in an annular drum 3, the flange of which is concentric about the axis of the shaft 1.

On the shaft 1, outwardly of the hub 2, a second hub 4 is loosely mounted from which an annular circular web 5 extends, and is continued as an integral flange 6 continuous except for a section at 6a (Fig. 1) cut therefrom. From the outer edges of the annular flange 6, an outwardly extending circular vertical wall 7 is provided which terminates in a return flange and pulley 8 around the drum 3 spaced therefrom and concentric about the axis of the shaft 1. The outer side of the flange 6 is closed by a cover plate 9a.

A band 12 of flat metal is permanently secured adjacent one end to the flange 6 at one side of the recess 6a therein. It is located around the flange 6 as shown in Fig. 2. The band extends to and partly over the opening at 6a at the other end thereof. At its outer side it carries a band or shoe 13 of friction brake or clutch material which is located within and closely adjacent to the inner walls of the drum 3.

A sleeve 4a is loosely mounted on the outer end of the shaft 11 and may rock thereon. On the sleeve 4a and integral therewith is a radially extending weight 16 and diametrically at the opposite side of the spring an arm 17, in partial counter balance of the weight 16, narrowed in width at its inner portion and having a pin 18 extending therefrom to which the inner end of the spring 14 is connected, said spring at its outer end being connected to the band 12 at its free end. A lug 19 extends from the sleeve 4a, through which a screw 20 is adjustably threaded, with its end coming against a post 21 cast with and projecting outwardly from the web 5. It is apparent that the tension of the spring may be adjusted by adjusting the screw 20.

In the operation, the pulley 8 having a belt around it connected with any suitable source of rotative power, when rotating in the direction indicated by the arrow in Fig. 1, will cause the annular flange 6 to rotate, and the bands 12 and 13 will tend to be thrown outwardly by centrifugal force. Upon the attainment of a sufficient speed to overcome and stretch the spring 14, the outer side of the clutching band 13 will press against the inner annular side of the drum 3 and a connection be made, whereupon said drum, the hub 2 and shaft 1 will be driven with the same speed of rotation as the hub 8.

When the speed drops below that at which the centrifugal force is effective to press the band 13 against the drum 3, an automatic disconnection between the driving pulley 8 and the driven drum 3 occurs. The adjustment of the tension of the spring 14 is availed of to control such connection of the driving and driven members. At a lighter tension the connection will take place at a lower speed of rotation of the driving pulley 8, and upon increasing the tension of the spring 14, the connection will take place only at an increased speed of the driving member.

Upon rapid deceleration of the engine the counter weights 16 and 18 aid in quick disengagement of the clutch. The counter weights riding freely within the clutch tend to continue their rotation when the clutch rotation is sharply reduced. As may appear from an example, if the engine is turning at 2,000 R. P. M., with the clutch engaged, if the engine power is cut off, the counter weights tend to continue at first at the speed of 2,000 R. P. M. and do not decelerate as fast as the engine. As a result, the spring 14 attached to the counter weight increases in tension and balances its centrifugal force, resulting in a quickly controlled clutch disengagement.

The construction is one which is readily and easily manufactured and assembled. The adjustment is particularly desirable, both for obtaining the most effective speed of operation of the driving member at which the clutch connection is to occur, and for adjustment to compensate for wear of the band 13.

The invention is defined in the appended claims and is to be considered comprehensive of all forms of structure coming within their scope.

I claim:

1. A pulley driven clutch comprising, a shaft, a circular drum fixed to said shaft, a pulley loosely mounted on said shaft, a friction band located closely adjacent the inner surface of said drum, and having one end fixed to said pulley, a weighted member loosely mounted on said shaft, means coacting between said pulley and said weighted member for positively driving the member in the direction of rotation of the pulley, said member being free to rotate in said direction faster than rotation of the pulley upon deceleration of the pulley, and a spring connecting said weighted member with the free end of said friction band.

2. The elements of claim 1 in which the fixed end of said friction band is in advance of the free end thereof in the direction of rotation.

MILTON L. HATFIELD.

REFERENCES CITED

The following references are of record in the file of this patent:

UNITED STATES PATENTS

| Number | Name | Date |
|---|---|---|
| 678,838 | Lefener | July 16, 1901 |
| 882,693 | Kingsbury | Mar. 24, 1908 |
| 1,451,506 | Graf et al. | Apr. 10, 1923 |
| 1,762,799 | Starkey | June 10, 1930 |
| 1,983,661 | Frantz et al. | Dec. 11, 1934 |
| 2,087,488 | Stanley | July 20, 1937 |

FOREIGN PATENTS

| Number | Country | Date |
|---|---|---|
| 389,886 | Great Britain | Mar. 27, 1933 |